(12) United States Patent
Andou et al.

(10) Patent No.: US 10,556,474 B2
(45) Date of Patent: Feb. 11, 2020

(54) FRONT SUSPENSION STRUCTURE OF AUTOMOTIVE VEHICLE

(71) Applicant: MAZDA MOTOR CORPORATION, Hiroshima (JP)

(72) Inventors: Fumitaka Andou, Hatsukaichi (JP); Norio Asano, Hiroshima (JP); Koji Takahashi, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 15/590,141

(22) Filed: May 9, 2017

(65) Prior Publication Data

US 2018/0001723 A1 Jan. 4, 2018

(30) Foreign Application Priority Data

Jul. 4, 2016 (JP) .................................. 2016-132272

(51) Int. Cl.
*B60G 3/26* (2006.01)
*B60G 3/20* (2006.01)

(52) U.S. Cl.
CPC ................. *B60G 3/26* (2013.01); *B60G 3/20* (2013.01); *B60G 2200/144* (2013.01)

(58) Field of Classification Search
CPC . B60G 3/26; B60G 7/001; B60G 3/20; B60G 2204/129; B60G 2200/144
See application file for complete search history.

(56) References Cited

U.S. PATENT DOCUMENTS

| 2,245,809 | A | * | 6/1941 | Olley | B60G 11/182 267/274 |
| 3,883,152 | A | * | 5/1975 | De Carbon | B60G 3/18 280/124.138 |
| 5,000,476 | A | * | 3/1991 | Lindorfer | B60G 3/26 280/124.107 |
| 5,048,858 | A | * | 9/1991 | Luger | B60G 3/20 280/124.136 |
| 5,284,353 | A | * | 2/1994 | Shinji | B60G 3/20 280/124.136 |
| 6,719,314 | B1 | * | 4/2004 | Schote | B60G 3/20 280/124.135 |

(Continued)

FOREIGN PATENT DOCUMENTS

| JP | H05-262111 A | 10/1993 |
| JP | 2006-264409 A | 10/2006 |
| JP | 2009-241871 A | 10/2009 |

*Primary Examiner* — Paul N Dickson
*Assistant Examiner* — Timothy Wilhelm
(74) *Attorney, Agent, or Firm* — Studebaker & Brackett PC (57) ABSTRACT

In a double-wishbone type front suspension structure, upper and lower arms are pivotally supported at a vehicle-body side via front-and-rear pivotal portions, axial lines of resilient bushes of the front and rear pivotal portions of the arms extend in a longitudinal direction, a knuckle-side pivotal portion of the upper arm is positioned in back of a knuckle-side pivotal portion of the lower arm, and a lower end portion of a damper unit provided between a vehicle body and the lower arm is connected to the lower arm such that the damper unit is positioned perpendicularly to the axial lines of the lower arm in a side view and an upper end portion is pivotally supported at the vehicle body via a rotational axis extending in the longitudinal direction.

3 Claims, 8 Drawing Sheets

(56) References Cited

U.S. PATENT DOCUMENTS

| | | | | |
|---|---|---|---|---|
| 6,942,050 B1 * | 9/2005 | Honkala | ................ | B62M 27/02 |
| | | | | 180/182 |
| 7,354,053 B2 * | 4/2008 | Satou | ....................... | B60G 7/02 |
| | | | | 280/124.122 |
| 7,661,689 B2 * | 2/2010 | Kinugasa | ................. | B60G 3/20 |
| | | | | 280/124.134 |
| 7,871,084 B2 * | 1/2011 | Hakui | .................... | B60G 7/006 |
| | | | | 280/5.521 |
| 8,052,160 B2 * | 11/2011 | Hirai | ...................... | B60G 3/20 |
| | | | | 280/124.135 |
| 8,061,726 B2 * | 11/2011 | Kunert | .................... | B60G 3/20 |
| | | | | 280/124.106 |
| 8,205,900 B1 * | 6/2012 | Moravy | .................. | B60G 3/20 |
| | | | | 280/124.138 |
| 8,454,041 B2 * | 6/2013 | Fujii | ....................... | B60G 3/20 |
| | | | | 280/124.125 |
| 2009/0243248 A1 | 10/2009 | Nakamura et al. | | |

* cited by examiner

FRONT SUSPENSION STRUCTURE OF AUTOMOTIVE VEHICLE

BACKGROUND OF THE INVENTION

The present invention relates to a front suspension structure of an automotive vehicle, and in particular, relates to a double-wishbone type front suspension structure of an automotive vehicle.

As the double-wishbone type front suspension structure of the automotive vehicle, there exists a structure in which respective vehicle-body-side end portions of two arms (an upper arm and a lower arm) which are arranged vertically and extend in a vehicle width direction are pivotally supported at a vehicle-body-side member, respective wheel-side end portions of the two arms are connected to a knuckle member (a wheel support) which rotatably supports a wheel via respective ball joints, and a damper unit is provided between a vehicle body and the lower arm. This structure has been used widely.

Herein, another type of structure as the double-wishbone type front suspension structure, in which the damper unit is arranged such that it is inclined toward a caster axis or a kingpin axis, has been used as well, which is disclosed in Japanese Patent Laid-Open Publication No. 2006-264409, for example.

A damper unit (10) disclosed in the above-descried patent document is configured such that its axial line (B) is inclined, in a plan view, toward a side having a caster axis so that its upper portion is positioned rearward (see FIG. 2 of the above-described patent document). Further, a lower arm (6), to which a lower end portion of the damper unit (10) is connected, is arranged such that it slants forward for preventing deterioration of an anti-dive geometry or the like (see FIG. 5). That is, the damper unit (10) of the above-described patent document is arranged in a rearward-and-downward slant state relative to the lower arm (6) in a side view.

In the above-described structure, however, there easily occurs twisting at a mount rubber which is provided at a connection portion of the an upper end (10a) of the damper unit (10) to the vehicle body when a vertical-direction load acts on the lower arm (6) from the wheel by way of a wheel support (8), for example, so that there is a concern that it may become difficult for the damper unit (10) to smoothly move vertically because of generation of a load which changes nonlinearly relative to the vertical move of the damper unit (10) or the like.

Meanwhile, there exists a front suspension structure in which the damper unit is not inclined toward the caster axis as shown in Japanese Patent Laid-Open Publication No. H05-262111. According to a suspension device disclosed in this patent document, a spring/shock absorber unit (30) as the damper unit is provided in a longitudinal direction such that it is inserted into an air duct (13) for brake-device cooling and also connected to a lower arm (21) via a link mechanism (50), so that a load applied from a wheel side can be transmitted to the spring/shock absorber unit (30) by way of the lower arm (21) and the link mechanism (50) which slants forward in a side view, and the layout property of the suspension device can be improved.

However, since the above-described link mechanism (50) is provided to slant between the lower arm (21) and the spring/shock absorber unit (30), there is a problem that the number of components or movable portions may improperly increase.

That is, there is room for improvement in compatibly attaining improvement of the wheel-support rigidity for improving the vehicle handling stability and the wheel's smooth vertical move for improving the road-following property and the riding conformability in the structures disclosed in the above-described patent documents.

SUMMARY OF THE INVENTION

Accordingly, an object of the present invention is to provide a front suspension structure of an automotive vehicle which can compatibly attaining the improvement of the vehicle handling stability for controlling the wheel with a quick response and stability and the wheel's smooth vertical move for improving the road-following property and the riding conformability.

The double-wishbone type front suspension structure of the automotive vehicle of the present invention comprises an upper arm pivotally supported at a vehicle-body side via front-and-rear pivotal portions thereof, a lower arm pivotally supported at the vehicle-body side via front-and-rear pivotal portions thereof, and a damper unit provided between a vehicle body and the lower arm, wherein resilient bushes are provided at the respective front-and-rear pivotal portions of the upper arm and the lower arm, respective axial lines of the resilient bushes of the front-and-rear pivotal portions of the lower arm are provided to coaxially extend in a longitudinal direction, a knuckle-side pivotal portion of the upper arm, via which a knuckle member is pivotally supported at the upper arm, is provided in back of a knuckle-side pivotal portion of the lower arm, via which the knuckle member is pivotally supported at the lower arm, the upper arm is supported at a front side frame such that respective axial lines of the resilient bushes of the front-and-rear pivotal portions of the upper arm coaxially extend in the longitudinal direction, in parallel to the respective axial lines of the resilient bushes of the front-and-rear pivotal portions of the lower arm in a plan view, and extends obliquely rearward and downward in a side view, and a lower end portion of the damper unit is connected to the lower arm such that the damper unit is positioned perpendicularly to the axial lines of the resilient bushes of the front-and-rear pivotal portions of the lower arm and an upper end portion of the damper unit is pivotally supported at the vehicle body via a rotational axis which extends in the longitudinal direction in parallel to the axial lines of the resilient bushes of the front-and-rear pivotal portions of the lower arm.

According to the structure of the present invention, twisting which may occur at the vehicle-body-side pivotal portions of the upper and lower arms and the vehicle-body-side connection portion of the damper unit can be so minimized that the vertical move can be smooth. Thereby, the improper geometry changes of the caster axis and the like which are caused by the twisting occurring at the respective connection portions can be suppressed. In other words, improvements of the responsiveness and the controllability due to the wheel's support rigidity improvement and the improvement of the road-following property can be compatibly attained.

In an embodiment of the present invention, the upper and lower arms are respectively made of an A-shaped arm which has a symmetrical shape in the longitudinal direction.

According to the structure of this embodiment, a load balance between the front and rear resilient bushes of the upper and lower arms for the load applied from the wheel can be properly increased. Thereby, the twisting occurring at the vehicle-body-side pivotal portions of the upper and lower arms and the vehicle-body-side connection portion of the damper unit can be further suppressed, so that changes of a kingpin angle or a caster angle can be further decreased, thereby improving the handling stability. Moreover, the twisting of the upper and lower connection portions of the damper unit can be suppressed, thereby further making the wheel's vertical move smooth.

In another embodiment of the present invention, the damper unit comprises a shock absorber and a coil spring which is provided at an upper portion of the shock absorber such that the coil spring overlaps the front side frame in a vertical direction, the upper arm is provided to straddle the coil spring longitudinally, and the respective resilient bushes provided at the front-and-rear pivotal portions of the upper arm and the lower arm substantially overlap each other in the plan view.

According to the structure of this embodiment, making a pitch between the resilient bushes of the front-and-rear pivotal portions of the upper arm properly long and arranging the lower arm perpendicularly to the damper unit in the side view can be compatibly attained, so that the double-wishbone type suspension can be properly compact such that each vertical position of the upper and lower arms is located within a level range of the wheel, compatibly attaining the wheel's support-rigidity improvement and the road-following property improvement, for example.

In another embodiment of the present invention, the damper unit is connected to a portion of the lower arm which is positioned in back of the knuckle-side pivotal portion of the lower arm, and a central axis of the damper unit is positioned in front of the knuckle-side pivotal portion of the upper arm.

According to the structure of this embodiment, layout of the upper and lower arms and the damper unit, including the shock absorber and others, can be more properly compact, setting the caster angle at an appropriate angle.

Other features, aspects, and advantages of the present invention will become apparent from the following description which refers to the accompanying drawings.

DETAILED DESCRIPTION OF THE INVENTION

Hereafter, an embodiment of the present invention will be described specifically referring to the drawings. In the following discerptions, an arrow F shows a vehicle forward side, an arrow R shows a vehicle rearward side, an arrow IN shows an inward side in a vehicle width direction, an arrow OUT shows an outward side in the vehicle width direction, and an arrow U shows a vehicle upward side in the figures.

Herein, right-and-left front suspension devices 1 are symmetrical laterally, so the left-side front suspension device 1 will be described.

Figure 1:
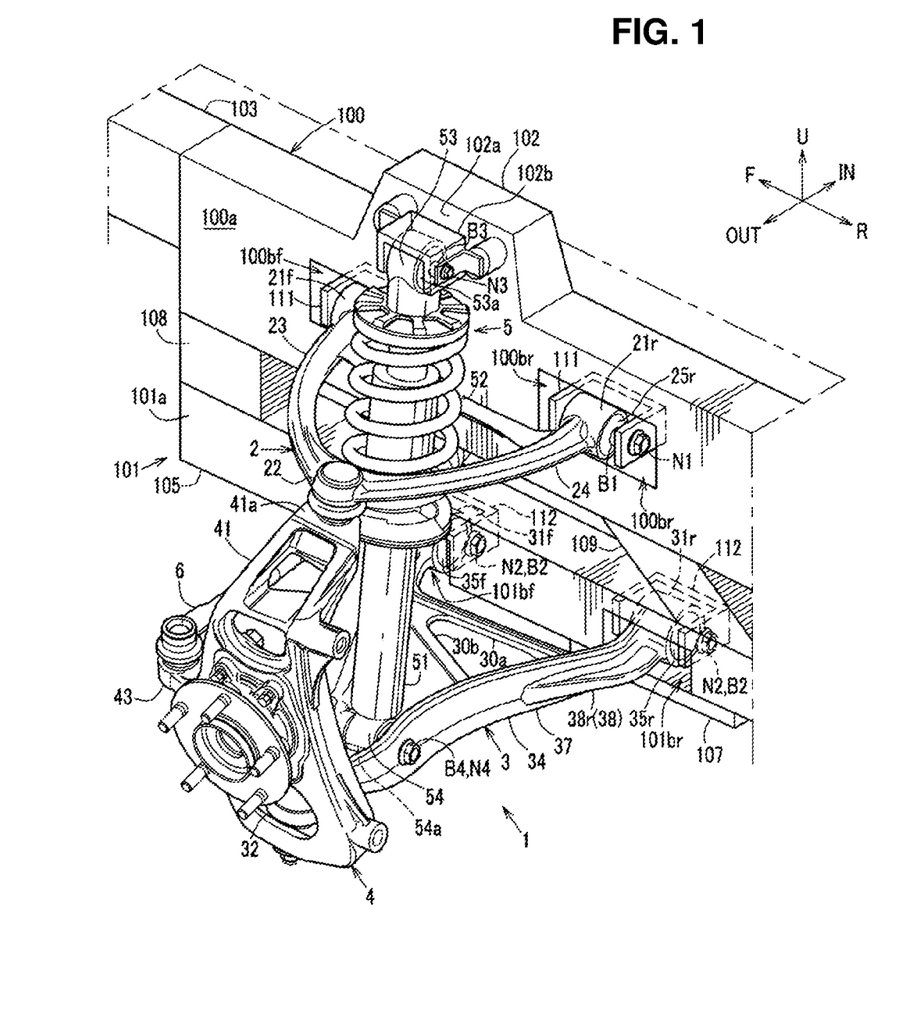
FIG. 1 is a perspective view of a state where a suspension device of a present embodiment is installed to a vehicle.

The front suspension device 1 of the present embodiment is, as shown in FIG. 1, arranged between a front side frame 100 and a front sub frame 101 which are provided at a vehicle-body front portion, and this front suspension device 1 is a double-wishbone type one which comprises an upper arm 2 which is attached to the front side frame 100, a lower arm 3 which is attached to a front sub frame 101, a wheel support member 4 (a wheel member or a knuckle member) which is attached to the upper and lower arms 2, 3, and a damper unit 5.

A structure of the vehicle-body front portion where the front suspension device 1 is arranged will be described briefly referring to FIGS. 1-4. Herein, FIGS. 1-4 schematically show a left-side vehicle-body front portion structure.

The front sub frame 101 extends in a longitudinal direction below the front side frame 100, and supports the lower arm 3 and others of the front suspension device 1.

The right-and-left front sub frames 101 comprise a pair of right-and-left side members 105 which extend in the longitudinal direction, a front cross member 106 (see FIGS. 3 and 4) which extends in a vehicle width direction between respective front portions of the right-and-left front side frames 101, and a lower brace 107 (a connecting member 107) (see FIG. 4) which extends in the vehicle width direction between the right-and-left front sub frames 101 in back of the front cross member 106.

The front sub frame 101 is connected to the front side frame 100 which is positioned above the front sub frame 101 via a vertical member 108 and an inclined member 109 which are provided at a forward side and a rearward side of the side member 105, respectively.

Figure 4:
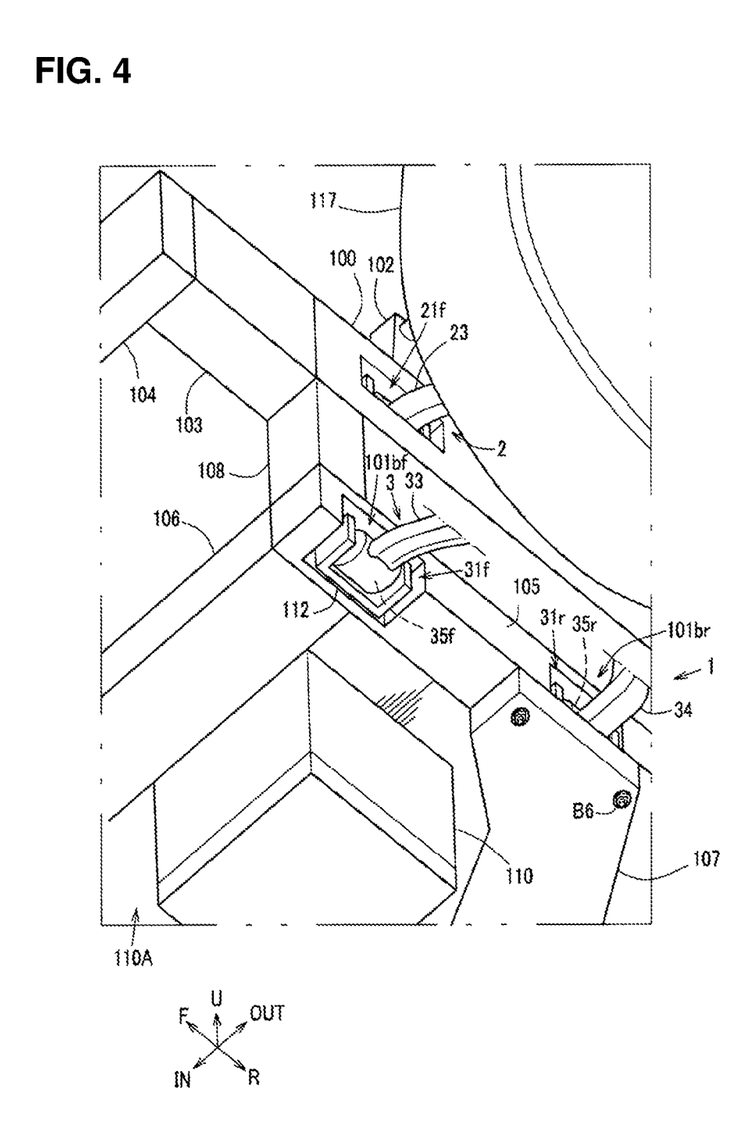
FIG. 4 is a perspective view of a major part of the state where the suspension device of the present embodiment is installed to the vehicle, when viewed from below.

Further, as shown in FIG. 4, an engine room 110A is formed at a space which is enclosed by the right-and-left side members 105, 105 (a left-side part of the vehicle is illustrated only), the front cross member 106, and the lower brace 107. In this engine room 110A is arranged a powertrain 110 (see FIG. 4) which includes an engine, a transmission, and an operational mechanism (deferential). The engine of the power train 110 may be a vertical-arrangement type or a lateral-arrangement type, and the engine room 110A may be a motor room where a motor or the like are arranged, in place of the engine.

Next, the structures of the upper arm 2 and the lower arm 3 will be described referring to FIGS. 1-3 and 5. The upper arm 2 includes vehicle-body-side pivotal portions 21 (21f, 21r) which are provided longitudinally, i.e., at a front side and a rear side, so as to pivotally support the upper arm 2 at the front side frame 100 provided on a vehicle-body side. Further, the upper arm 2 comprises a front-side arm portion 23 and a rear-side arm portion 24 such that it is formed in a forked shape. The upper arm 2 is configured in an A shape in a plan view such that front-side arm portion 23 and the rear-side arm portion 24 are roughly symmetrical longitudinally relative to the vehicle width direction (see FIG. 5).

Cylindrical resilient bushes 25 (25f, 25r) are inserted into the front and rear vehicle-body-side pivotal portions 21f, 21r, and these bushes 25 (25f, 25r) are configured to have the same characteristics of the elastic coefficient and the like. Further, the upper arm 2 is provided to slant reward and downward relative to a horizontal line (see FIG. 2).

Because of the rearward-and-downward slant arrangement of the upper arm 2, a pitch center Pc (see FIG. 2) which is set by layout of the upper and lower arms 2, 3 can be appropriate from a perspective of an anti-dive geometry even if the lower arm 3 is configured to have a horizontal position, so that a resistant force against a nose-dive force which occurs through a vehicle-body pitching during vehicle braking can be generated, thereby decreasing the nose-dive properly. Herein, the above-described pitch center Pc means a central position (the center of gravity of the vehicle) of a vehicle's pitching motion where the vehicle is vibrated longitudinally.

As shown in FIGS. 1-3, 6 and 7, the lower arm 3 includes vehicle-body-side pivotal portions 31 (31$f$, 31$r$) which are provided longitudinally, i.e., at a front side and a rear side, so as to pivotally support the lower arm 3 at the front sub frame 101 provided on the side of the vehicle body. Further, the lower arm 3 comprises a front-side arm portion 33 which extends between the front vehicle-body-side pivotal portion 31$f$ and a knuckle-side pivotal portion 32 and a rear-side arm portion 34 which extends between the rear vehicle-body-side pivotal portion 31$r$ and the knuckle-side pivotal portion 32 such that it is formed in the forked shape. Further, the lower arm 3 is configured in the A shape in the plan view such that the front-side arm portion 33 and the rear-side arm portion 34 are roughly symmetrical longitudinally relative to the vehicle width direction.

Figure 8:
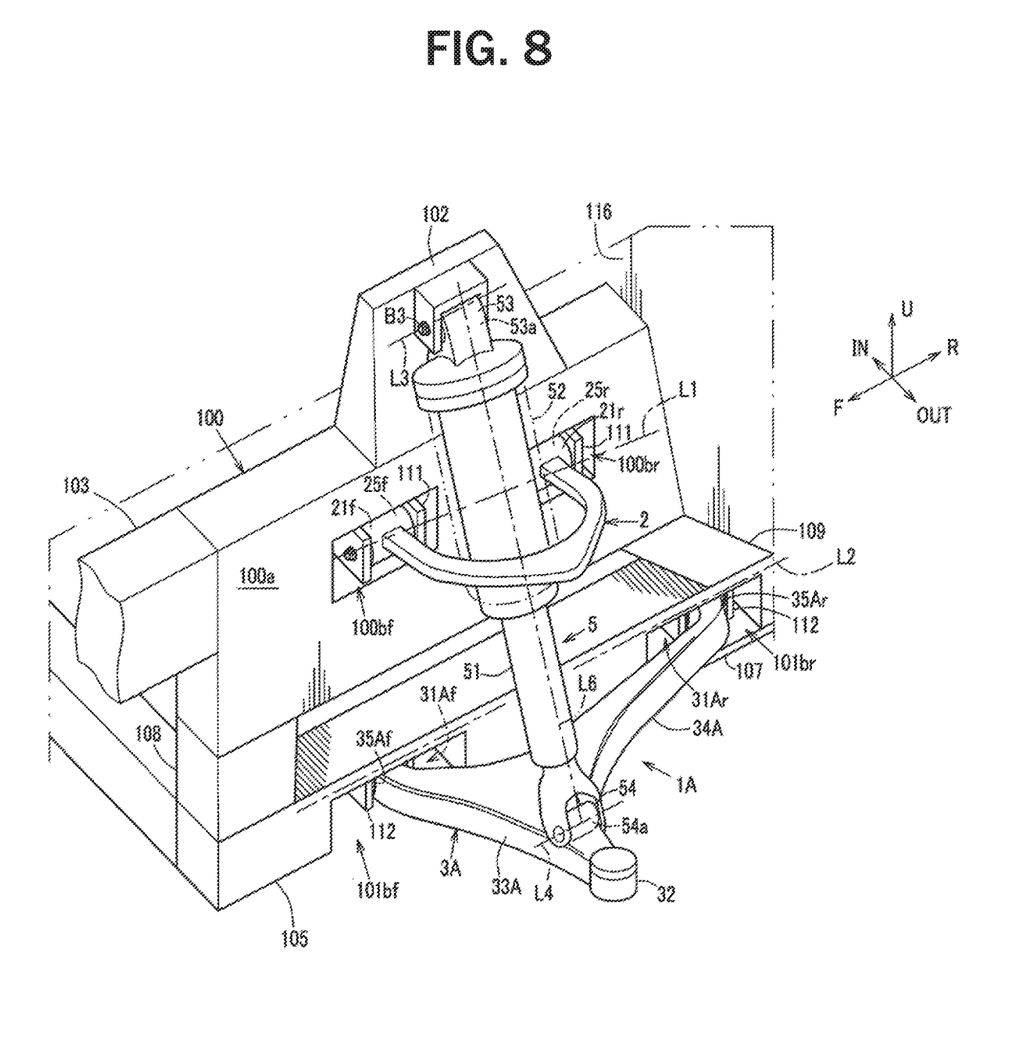
FIG. 8 is a schematic diagram of a state where a suspension device of another embodiment is installed to the vehicle.

Specifically, a front suspension device 1A of another embodiment, which will be described later, comprises an L-shaped lower arm 3A which is configured such that a rear-side arm portion 34A extends rearward more than the rear-side arm portion 34 of the above-described embodiment, as shown in FIG. 8. In this L-shaped lower arm 3A, a resilient bush 35A$r$ of a rear vehicle-body-side pivotal portion 31A$r$ is configured such that its compliance is greater (i.e., softer) than that of a resilient bush 35A$f$ of a front vehicle-body-side pivotal portion 31A$f$, whereby the rear vehicle-body-side pivotal portion 31A$r$ can be prevented from being twisted when a moment load to make the rear vehicle-body-side pivotal portion 31A$r$ swing in a vertical direction around a front-side arm portion 33A because of a load applied from a front wheel 117 is applied.

Meanwhile, according to the A-shaped lower arm 3 of the present embodiment, the load applied from the wheel is dispersed to the front and rear vehicle-body-side pivotal portions 31$f$, 31$r$ more than the above-described L-shaped lower arm 3A, so that the respective compliances of the resilient bushes 35$f$, 35$r$ of the front and rear vehicle-body-side pivotal portions 31$f$, 31$r$ are set to be equalized, compared to the compliances of the resilient bushes 35A$f$, 35A$r$ of the front and rear vehicle-body-side pivotal portions 31A$f$, 31A$r$ of the L-shaped lower arm 3A.

Figure 5:
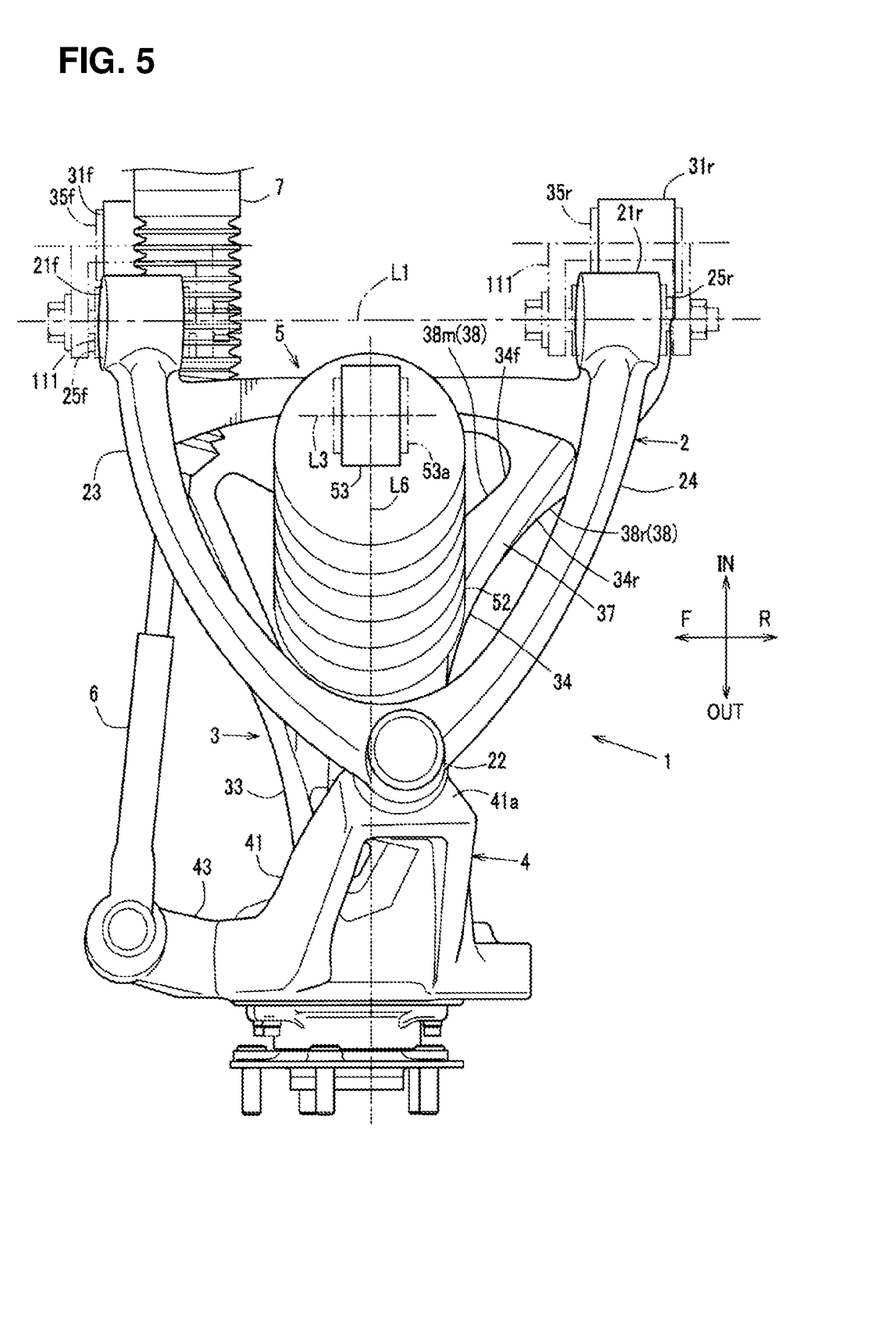
FIG. 5 is a plan view of the suspension device of the present embodiment.
Figure 6:
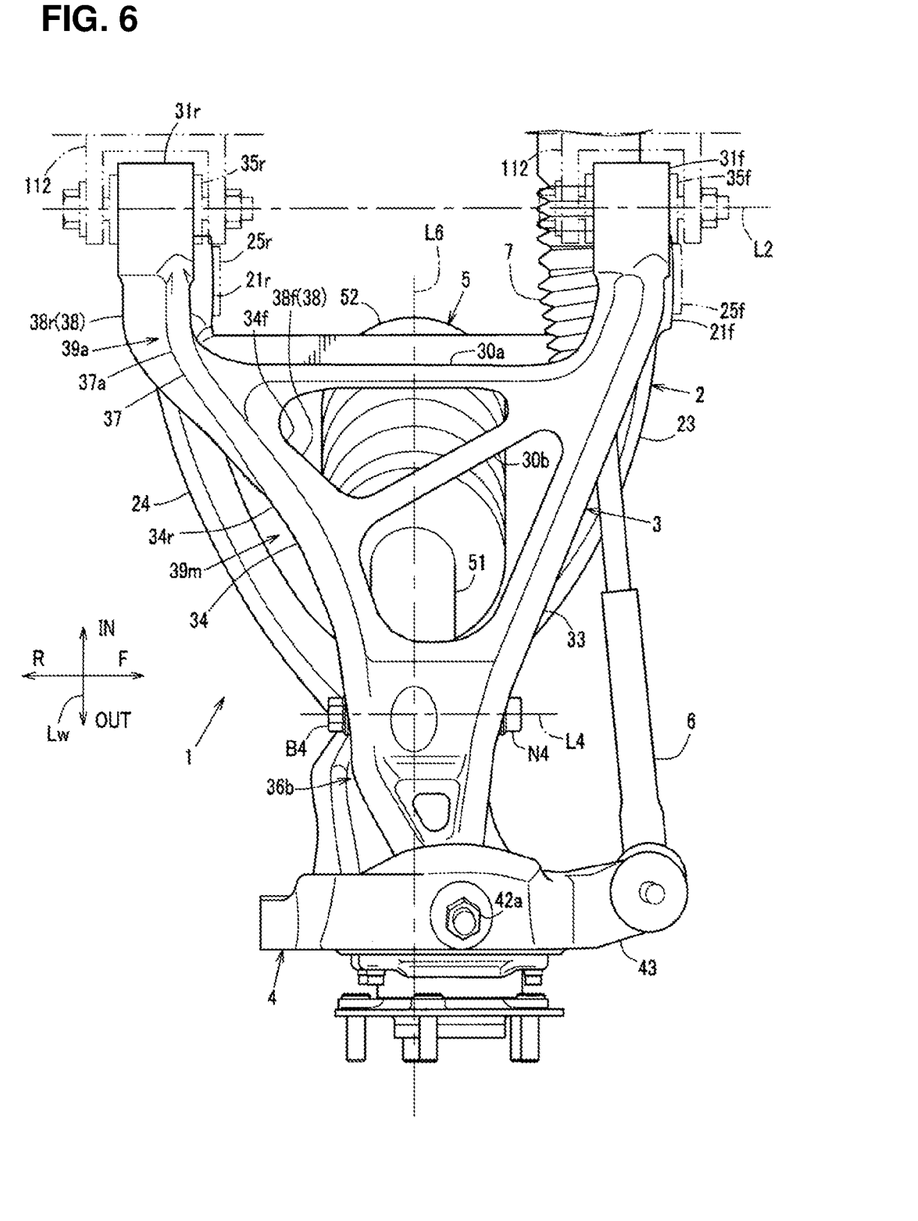
FIG. 6 is a bottom view of the suspension device of the present embodiment.

Further, the upper and lower arms 2, 3 are arranged such that the front vehicle-body-side pivotal portion 21$f$ of the upper arm 2 roughly overlaps the front vehicle-body-side pivotal portion 31$f$ of the lower arm 3 and the rear vehicle-body-side pivotal portion 21$r$ of the upper arm 2 roughly overlaps the rear vehicle-body-side pivotal portion 31$r$ of the lower arm 3 in the plan view (see FIGS. 5 and 6).

Moreover, in the upper and lower arms 2, 3, by preventing the respective resilient bushes from being twisted relative to their bush axes, each geometry change of the caster axis and the like is suppressed and also each vertical swing of the respective pivotal portions is made smooth.

Figure 7A:
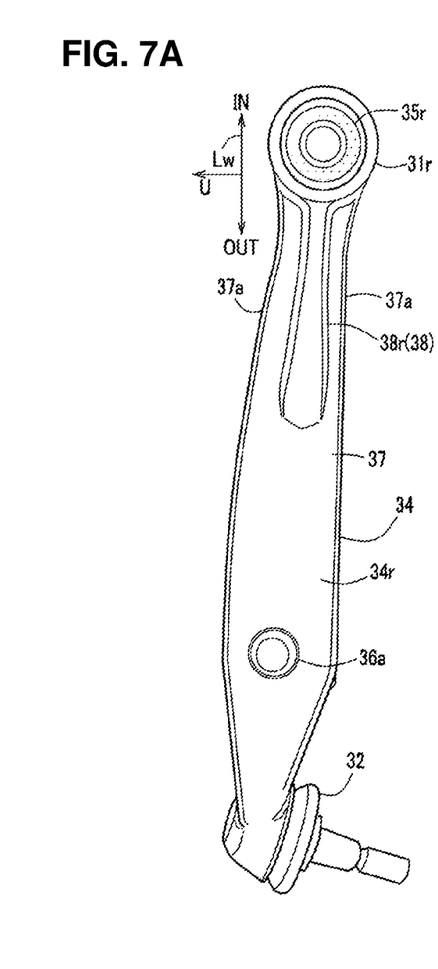
FIG. 7A is a back view of a lower arm of the present embodiment and FIG. 7B is a bottom view of the lower arm of the present embodiment.
Figure 7B:
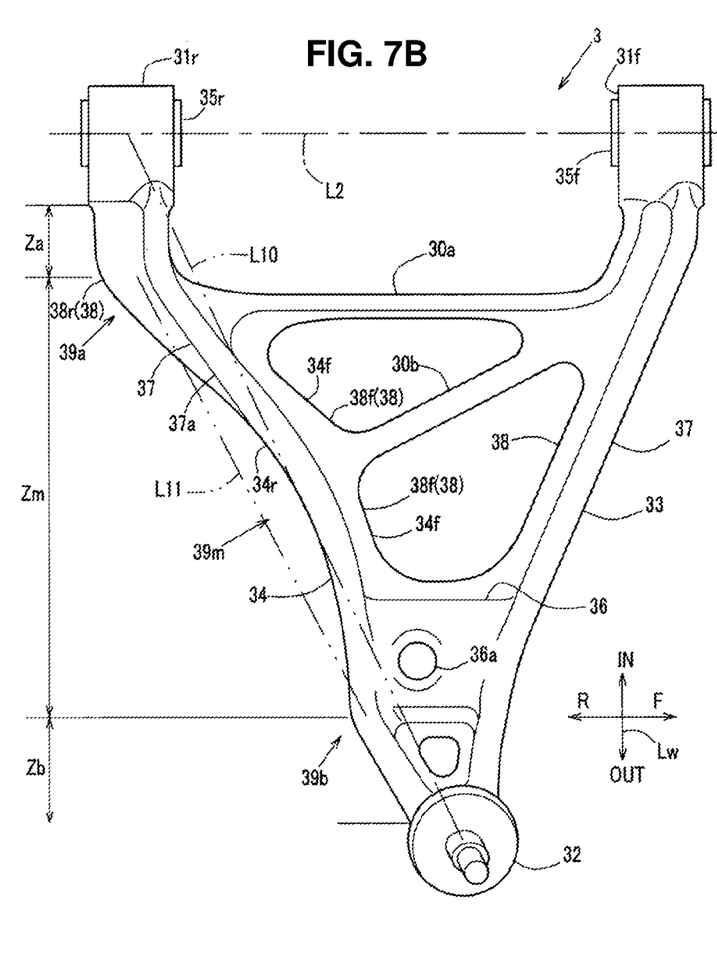

Next, a specific structure of the lower arm 3 will be descried referring to FIGS. 7A and 7B which illustrate the lower arm 3 by separating parts, in the vehicle width direction, of the lower arm 3 into a wheel-side (on the side of the wheel support member 4) area Zb, a vehicle-body-side area Za, and an intermediate area Zm. FIG. 7A is a bottom view of the lower arm 3 and FIG. 7B is a back view of the lower arm 3.

The rear-side arm portion 34 extends obliquely rearward and inward, whose oblique angle is greater than that of the front-side arm portion 33. That is, the rear-side arm portion 34$a$ is inclined in the plan view such that a rearward-offset degree of the rear-side arm portion 34 is greater than a forward-offset degree of the front-side arm portion 33.

A longitudinally-extending damper support member 36 for supporting a shock absorber 51 of the damper unit 5 is formed at an outward portion, in the vehicle width direction, of the intermediate area Zm positioned between the front-side arm portion 33 and the rear-side arm portion 34 of the lower arm 3. The damper support member 36 includes a damper pivotal portion 36$a$ for pivotally supporting a lower end portion 54 of the shock absorber 51.

The front-side arm portion 33, the rear-side arm portion 34, and the damper support member 36 form a truss structure at the wheel-side area Zb for reinforcing.

In the intermediate area Zm, the front-side arm portion 33 is configured to extend straightly, whereas the rear-side arm portion 34 is configured to curve (bend), having a forward-bending portion 39$m$ (hereafter, referred to as "intermediate bending portion 39$m$"), so as not to interfere with a front wheel 117 to be steered. That is, as shown in FIG. 7B, the rear-side arm portion 34 curves forward beyond an imaginary straight line L10 which extends straightly, connecting the rear vehicle-body-side pivotal portion 31$r$ and the knuckle-side pivotal portion 32 of the lower arm 3. In other words, the rear-side arm portion 34 curves forward beyond an imaginary straight line L11 which extends straightly, connecting a border portion of the wheel-side area Zb and the intermediate area Zm (a wheel-side bending portion 39$b$ which will be described later) and a border portion of the intermediate area Zm and the vehicle-body-side area Za (a wheel-side bending portion 39$b$ which will be described later) (see FIG. 7B).

In the vehicle-body-side area Za, the rear-side arm portion 34 and the front-side arm portion 33 extend roughly in the longitudinal direction.

Further, at the rear-side arm portion 34 and the front-side arm portion 33 are provided a vertical wall portion 37 which is configured to extend in the vertical direction and a horizontal rib 38 which is configured to be thinner, in the vertical direction, than the vertical wall portion 37 and protrude, in the longitudinal direction, relative to the vertical wall portion 37.

A cross section of the vertical wall portion 37 is configured such that its vertical-direction thickness is greater than its longitudinal-direction thick, and the vertical wall portion 37 has vertical ribs 37$a$ which protrude on upper and lower sides relative to the horizontal rib 38 (see FIGS. 7A and 7B). Herein, the vertical wall portion 37 may be configured alternatively such that the single vertical rib 37$a$ is provided at either side of the upper and lower sides.

Hereafter, the vertical wall portion 37 and the horizontal rib 38 of the rear-side arm portion 34 will be described. The vertical wall portion 37 includes, additionally to the above-described intermediate bending portion 39$m$, a bending portion 39$b$ (hereafter, referred to as "wheel-side bending portion 39$b$") at the border portion of the wheel-side area Zb and the intermediate area Zm, and also includes a bending portion 39$a$ (hereafter, referred to as "vehicle-body-side bending portion 39$a$") at the border portion of the intermediate area Zm and the vehicle-body-side area Za. Thus, the vertical wall portion 37 includes three bending portions 39 (39a, 39m, 39b), in total. The wheel-side bending portion 39b and the vehicle-body-side bending portion 39a are configured to be convex rearward.

The vertical wall portion 37 is configured to extend in a S shape in the plan view such that the two bending portions 39 of the vehicle-body-side bending portion 39a and the intermediate bending portion 39m are formed at the intermediate area Zm and the vehicle-body-side area Za (see FIG. 7B).

The horizontal rib 38 includes a rear-side horizontal rib 38r which extends forward from a rear portion of the rear vehicle-body-side pivotal portion 31r, approaching the vertical wall portion 37, and a front-side horizontal rib 38f which extends from a front portion of the intermediate bending portion 39m toward a front portion of the rear vehicle-body-side pivotal portion 31r, approaching the vertical wall portion 37.

The rear-side horizontal rib 38r protrudes rearward horizontally from a middle position, in the vertical direction, of a rear portion of the vertical wall portion 37 such that it is integrally joined to the rear portion and an inward edge, in the vehicle width direction, of the rear vehicle-body-side pivotal portion 31r, and extends outward, in the vehicle width direction, from the wheel-side area Zb of the vertical wall portion 37 up to the intermediate area Zm, passing a rear portion of the vehicle-body-side bending portion 39a. Further, a protrusion length of the rear-side horizontal rib 38r becomes shorter such that a rear edge 34r of a one side, in the longitudinal direction, of the rear-side horizontal rib 38r gradually approaches the vertical wall portion 37.

The front-side horizontal rib 38f protrudes forward horizontally from a middle position, in the vertical direction, of a front portion of the vertical wall portion 37, and extends from a joint portion of the vertical wall portion 37 to the damper support member 36 up to the border portion of the intermediate area Zm and the vehicle-body-side area Za, passing the front portion of the intermediate bending portion 39m. Further, a protrusion length of the front-side horizontal rib 38f becomes shorter such that a front edge 34f of the other side, in the longitudinal direction, of the front-side horizontal rib 38f gradually approaches the vertical wall portion 37.

The rear-side arm portion 34 is configured such that its rear edge 34r is formed by a portion of the vertical wall portion 37 where the rear-side horizontal rib 38r is not formed and the rear-side horizontal rib 38r, and its front edge 34f is formed by a portion of the vertical wall portion 37 where the front-side horizontal rib 38f is not formed and the front-side horizontal rib 38f.

The above-described vertical wall portion 37 extends continuously, interconnecting the rear vehicle-body-side pivotal portion 31r and the knuckle-side pivotal portion 22 at the rear-side arm portion 34, and extends straightly so as to approach a vehicle-width-direction standard line (Lw) (see FIGS. 7A and 7B) more than respective ridgelines of the front edge 34f and the rear edge 34r of the rear-side arm portion 34. Herein, the vehicle-width-direction standard line Lw denotes an imaginary straight line which is parallel to the vehicle width direction, which does not include a component of the vertical direction and a component of the longitudinal direction as shown in FIGS. 7A and 7B.

In other words, the vertical wall portion 37 extends closely to a front side of a longitudinal width of the rear-side arm portion 34 (closely to the front edge 340 at the vehicle-body-side area Za and extends closely to a rear side of the longitudinal width of the rear-side arm portion 34 (closely to the rear edge 34r) at the intermediate Zm so as to interconnect the rear vehicle-body-side pivotal portion 31r and the knuckle-side pivotal portion 22 with a shortest path.

The lower arm 3 has the truss structure in the plan view at the vehicle-body-side area Zb as described above, so a sufficient strength can be ensured. The vertical wall portion 37 of the rear-side arm portion 34 extends obliquely inward, in the vehicle width direction, and rearward more at the wheel-side area Zb having a high strength as described above such that its shift degree toward a front side of the front-side arm portion 33 is greater than its shift degree toward a rear side of the front-side arm portion 33. Accordingly, a longitudinal component of the vertical wall portion 37 at the wheel-side area Zb can be ensured, so that a longitudinal component of the vertical wall portion 37 at the intermediate area Zm and the vehicle-body-side area Za can be shortened.

Accordingly, the vertical wall portion 37 ensures its sufficient strength with the truss structure at the wheel-side area Zb where the longitudinal component is large, and also the vertical wall portion 37 can be made properly straight at the intermediate area Zm and the vehicle-body-side area Za such that the S-shaped vertical wall portion 37 approaches the vehicle-width-direction standard line.

The lower arm 3 further includes two strengthening members 30a, 30b which interconnect the rear-side arm portion 34 and the front-side arm portion 33. The vehicle-body-side reinforcing member 30a extends in the longitudinal direction so as to interconnect respective border portions of the intermediate area Zm and the vehicle-body-side area Za of the front-side arm portion 33 and the rear-side arm portion 34. Meanwhile, the wheel-side reinforcing member 30b extends obliquely inward, in the vehicle width direction, and forward so as to interconnect the intermediate bending portion 39m of the rear-side arm portion 34 and a corner portion where the front-side arm portion 33 and the vehicle-body-side reinforcing member 30a are joined together.

That is, the vertical wall portion 37 of the rear-side arm portion 34 is connected, at the vehicle-body-side bending portion 39a, to the front-side arm portion 33 via the front-side horizontal rib 38f at the vehicle-body-side reinforcing member 30a, and connected, at the intermediate bending portion 39m, to the front-side arm member 33 via the front-side horizontal rib 38f at the wheel-side reinforcing member 30b.

Attachments of the upper arm 2 and the lower arm 3 to the vehicle body will be described referring to FIGS. 1-4. Attachment recess portions 100b (100bf, 100br) where the upper arm 2 is attached are provided at an outward side, in the vehicle width direction, of a side wall face 100a of the front side frame 100, being longitudinally spaced apart from each other. An attaching bracket 111 which is configured in a U shape in the plan view to open outward is fixed to a side wall of an inside of each of the attachment recess portions 100b with a fastening means, such as a bolt B1 and a nut N1, or a welding means.

Figure 3:
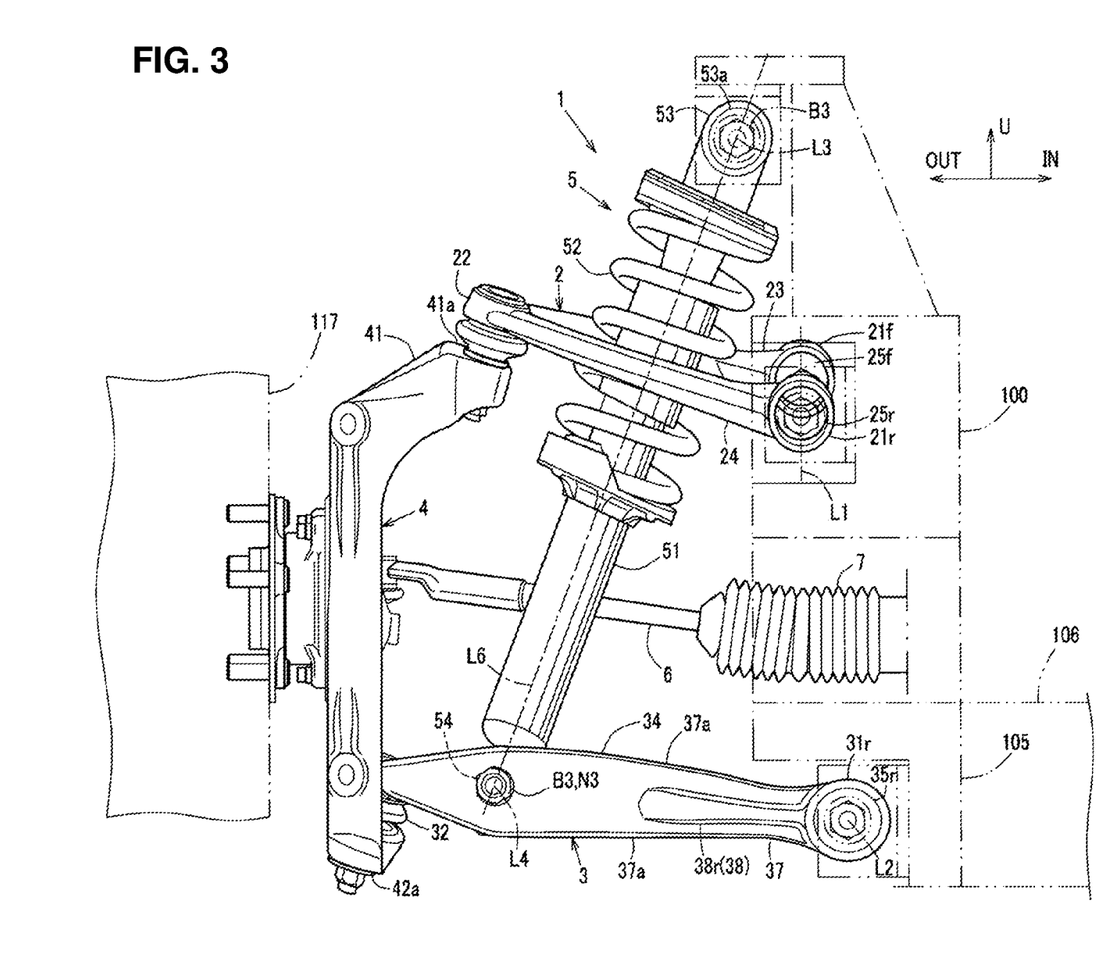
FIG. 3 is a back view of the state where the suspension device of the present embodiment is installed to the vehicle.

The front and rear attaching brackets 111 are attached to the side wall face 100a such that respective axial lines L1 coaxially extend in the longitudinal direction in the plan view (see FIG. 5) and extend obliquely rearward and downward in the side view (see FIG. 3).

The resilient bushes 25f, 25r provided at the front and rear vehicle-body-side pivotal portions 21f, 21r of the upper arm 2 are supported at the attaching brackets 111 provided at the attachment recess portions 100b of the front side frame 100 via their central axes (L1) with the bolt B1 extending in the longitudinal direction and the nut N1.

Thereby, the upper arm 2 is pivotally supported at the front side frame 100 in a state in which the axial lines L1 of the front and rear resilient bushes 25*f*, 25*r* coaxially extend in the longitudinal direction in the plan view (see FIG. 5) and extend obliquely rearward and downward in the side view (see FIG. 3) as described above.

Further, attachment recess portions 101*b* (101*bf*, 101*br*) which are configured to open outward and downward, where the lower arm 3 is attached, are provided at an outward side wall face 101*a*, in the vehicle width direction, of the front sub frame 101, being longitudinally spaced apart from each other. An attaching bracket 112 which is configured to open outward is fixed to a side wall of an inside of each of the attachment recess portions 101*b* with a fastening means, such as a bolt B2 and a nut N2, or a welding means (see FIGS. 2 and 6).

The front and rear attaching brackets 112 are fixed such that respective axial lines L2 (rotational axes) coaxially extend in the longitudinal direction.

The resilient bushes 35*f*, 35*r* provided at the front and rear vehicle-body-side pivotal portions 31 of the lower arm 3 are supported at the attaching brackets 112 provided at the attachment recess portions 101*b* of the front sub frame 101 via their central axes (L2) with the bolt B2 extending in the longitudinal direction and the nut N2.

Figure 2:
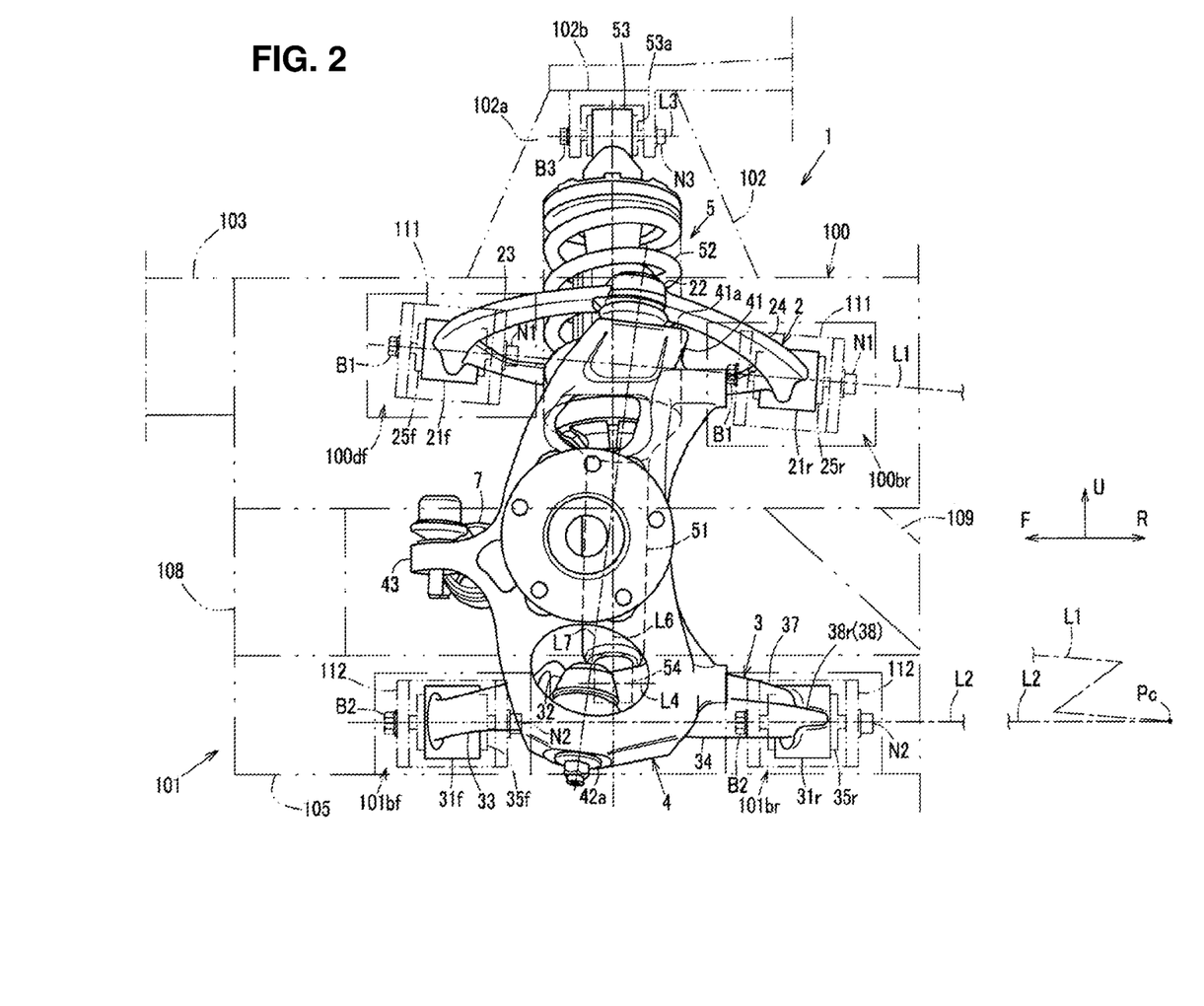
FIG. 2 is a side view of the state where the suspension device of the present embodiment is installed to the vehicle.

Thereby, the lower arm 3 is pivotally supported at the front sub frame 101 in a state in which the axial lines L2 of the front and rear resilient bushes 35*f*, 35*r* coaxially extend in the longitudinal direction and horizontally (see FIGS. 2 and 6).

Meanwhile, as shown in FIG. 4, the above-described lower brace 107 is fixedly fastened to a bottom face of the side member 105 with a bolt B6 and the like. This lower brace 107 is attached such that it straddles the rear-side attachment recess portion 101*br* in the longitudinal direction. That is, the lower brace 107 is fixedly fastened to forward and rearward positons of the rear-side attachment recess portion 101*br* of the side member 105 with the bolt B6 and the like. The lower brace 107 extends from its attachment portion to the side member 105 to the other-side attachment portion (not illustrated) such that a central portion, in the vehicle width direction, thereof avoids the power train 110.

Further, the front cross member 106 increases a transmission efficiency of the load applied from the lower arm 3 by positioning the resilient bush 35 provided at the front vehicle-body-side pivotal portion 31*f* of the lower arm 3 so as to overlap the front-side attaching bracket 112 in the longitudinal direction (so as to face the front-side attaching bracket 112 in the vehicle width direction).

The above-described wheel support member 4 rotatably supports the front wheel 117, a disc brake, and others, and to this wheel support member 4 are attached the knuckle-side pivotal portions 22, 32 which the upper and lower arms 2, 3 have at respective outward ends, in the vehicle width direction, thereof (see FIGS. 2 and 3).

Specifically, as shown in FIGS. 2, 3 and 6, the wheel support member 4 comprises an upward extension portion 41 which extends upward at a central position, in the longitudinal direction, thereof, the upper arm 2 is attached to an upper end portion 41*s* of the upward extension portion 41 via a ball joint, and the lower arm 3 is attached to a lower end portion 42*a* of the wheel support member 4 via a ball joint. The wheel support member 4 further comprises, as shown in FIG. 5, a forward extension portion 43 (knuckle arm) which extends forward at a central position, in the vertical direction, thereof and connects a tie rod 6 which will be described later.

As shown in FIGS. 1-3 and 5, the above-described damper unit 5 comprises the shock absorber 51 and a coil sprig 52, the coil spring 52 is provided around an upper portion of the shock absorber 51 such that their central axes L6 are arranged coaxially, and the central axes L6 extend in the vertical direction perpendicularly to the axial lines L2 of the lower arm in the side view (see FIG. 2). The shock absorber 51 which is provided between the vehicle body and the lower arm 3 is connected to the lower arm 3 at its lower end portion 54 and pivotally supported at the vehicle body at its upper end portion 53.

Specifically, a resilient bush 53*a* is inserted into the upper end portion 53 (vehicle-body-side pivotal portion) of the damper unit 5 such that its axial center L3 extends in the longitudinal direction (see FIGS. 1 and 2).

Herein, as shown in FIG. 1, to an outward-side wall face 102*a*, in the vehicle width direction, of a suspension tower 102 which is provided at an upper face of the front side frame 100 is fixed an attaching bracket 102*b* which is configured to open roughly downward with the fastening means, such as the bolt and the nut, or the welding means.

Further, the resilient bush 53*a* provided at the upper end portion 53 of the damper unit 5 is supported at the attaching bracket 102*b* via a bolt B3 as a rotational axis (L4) extending in the longitudinal direction and a nut N3 (see FIG. 1).

Meanwhile, a resilient bush 54*a* is inserted into the lower end portion 54 (lower-arm-side pivotal portion) of the damper unit 5 such that its axial center L4 extends in the longitudinal direction (see FIGS. 1 and 2).

The resilient bush 54*a* provided at the lower end portion 54 of the damper unit 5 is supported at the above-described damper pivotal portion 36*a* of the lower arm 3 via a bolt B4 as the rotational axis (L4) extending in the longitudinal direction and a nut N4 (see FIGS. 7A and 7B).

Moreover, as shown in FIGS. 1-3, the upper portion of the damper unit 5, i.e., the upper portion of the shock absorber 51, and the coil spring 52 provided at the upper portion of the shock absorber 51 are arranged on the outward side, in the vehicle width direction, of the front side frame 100 such that they overlap the front side frame 100 in the vertical direction.

The upper arm 2 is arranged such that the front-side arm portion 23 is positioned in front of the damper unit 5 and the rear-side arm portion 24 is positioned in back of the damper unit 5. That is, the upper arm 2 is provided to longitudinally straddle the coil spring 52 of the damper unit 5 (see FIGS. 1, 2 and 5).

Further, as shown in FIG. 2, the knuckle-side pivotal portion 22 of the upper arm 2 where the wheel support member 4 is pivotally supported is provided in back of the knuckle-side pivotal portion 32 of the lower arm 3, and a caster axis L7 which passes (connects) the pivotal portions 22, 32 forms a positive caster which slants such that its upper side is positioned relatively rearward. The lower end portion 54 of the damper unit 5 is positioned in back of the knuckle-side pivotal portion 32 of the lower arm 3, and the upper end portion 53 of the damper unit 5 is positioned in front of the knuckle-side pivotal portion 22 of the upper arm 2 (see FIG. 2). That is, the shock absorber 51 of the damper unit 5 is connected to the lower arm 3 at a positon which is located in back of the knuckle-side pivotal portion 32 of the lower arm 3, and the central axis L6 is positioned in front of the knuckle-side pivotal portion 22 of the upper arm 2.

As shown in FIGS. 2 and 5, the front suspension device 1 further comprises a steering gear unit 7 which extends in the vehicle width direction at a forward side and the tie rod 6 which extends outward, in the vehicle width direction, from the steering gear unit 7 and is attached to the forward extension portion 43 of the wheel support member 4.

The front suspension device 1 of the above-described embodiment is the double-wishbone type front suspension device of the automotive vehicle, in which the upper and lower arms 2, 3 are pivotally supported at the vehicle-body side via their respective front-and-rear pivotal portions 21f, 21r, 31f, 31r, the resilient bushes 25 (25f, 25r) are provided at the front-and-rear pivotal portions 21f, 21r of the upper arm 2 and the resilient bushes 35 (35f, 35r) are provided at the front-and-rear pivotal portions 31f, 31r of the lower arm 3 (see FIGS. 1-3, 5 and 6), the axial lines L2 of the front-and-rear resilient bushes 35f, 35r of the lower arm 3 coaxially extend in the longitudinal direction (see FIGS. 2 and 6), the knuckle-side pivotal portion 22 of the upper arm 2, via which the wheel support member 4 (knuckle member) is pivotally supported at the upper arm 2, is provided in back of the knuckle-side pivotal portion 32 of the lower arm 3 (see FIG. 2), the upper arm 2 is supported at the front side frame 100 such that the axial lines L1 of the front-and-rear resilient bushes 25f, 25r coaxially extend in the longitudinal direction in the plan view (see FIG. 5) and extend obliquely rearward and downward in the side view (see FIG. 2), the damper unit 5 is provided between the vehicle body and the lower arm 3, and the lower end portion 54 of the damper unit 5 is connected to the lower arm 3 such that the damper unit 5 is positioned perpendicularly to the axial lines L2 of the lower arm 3 in the side view and the upper end portion 53 of the damper unit 5 is pivotally supported at the vehicle body with the bolt B3 and the like as the rotational axis extending in the longitudinal direction (see FIGS. 1 and 2).

According to the above-described structure, twisting of the respective resilient bushes 25, 35, 53a of the connection portions (the vehicle-body-side pivotal portions 21, 31, the upper end portion 53 of the damper unit 5) of the upper and lower arms 2, 3 and the damper unit 5 to the vehicle body can be so minimized that the vertical move can be smooth. Thereby, the wheel's support rigidity improvement by stabilizing the caster angle and the like and the improvements of the road-following property and the riding conformability can be compatibly attained.

Specifically, according to the above-described structure, the axial lines L1, L2 of the bolts B1, B2 as the rotational axes of the front and left vehicle-body-side resilient bushes 25, 35 of the upper and lower arms 2, 3 coaxially extend in the longitudinal direction at least in the plan view (see FIGS. 5 and 6), the upper end portion 53 of the damper unit 5 is pivotally supported at the vehicle body via the bolt B3 as the rotational axis extending in the longitudinal direction (see FIG. 5), and, in the present embodiment, the lower end portion 54 of the damper unit 5 is also pivotally supported at the vehicle body via the bolt B4 as the rotational axis extending in the longitudinal direction (see FIG. 6) and these all connection portions are configured to rotate around the axes extending in the longitudinal direction. Thereby, the twisting of the resilient bushes 25, 35, 53a, 54a provided at the connection portions can be minimized.

Moreover, since the damper unit 5 is configured such that its lower end portion 54 is connected perpendicularly to the axial line L2 of the lower arm 3 and its upper end portion 53 is pivotally supported at the vehicle body via the bolt B3 which forms the rotational axis L3 extending in the longitudinal direction in the side view as well (see FIG. 2), the vertical-direction load transmitted from the vertically-moving lower arm 3 can be received properly without any twisting of the pivotal portion of the upper end portion 53 of the damper unit 5 provided at the vehicle body, thereby making the vertical move properly smooth.

Specifically, in a conventional structure in which the damper unit is inclined relative to the lower arm, not perpendicularly to the lower arm, in the side view, when the vertical-direction load (the load generated in the vertical direction) acts on the lower arm, for example, a load generated in other directions than a perpendicular direction to the axis acts on a mount rubber, not illustrated, provided at the connection portion of the upper end of the damper unit to the vehicle-body-side suspension tower, so that twisting easily occurs at the mount rubber. Consequently, a nonlinear load which changes greatly compared to a load caused by the mount rubber's deformation generated in the perpendicular direction to the axis of the mount rubber is generated. Therefore, not only it may become difficult to make the vertical move of the damper unit smooth but it may become necessary to use the mount rubber having a rather-low elastic coefficient, considering a tendency of the above-described easily-occurring twisting of the mount rubber, so that there is still room for development in increasing the wheel's support rigidity properly.

According to the present embodiment, meanwhile, since the damper unit 5 is arranged perpendicularly to the horizontal lower arm 3, when the vertical-direction load transmitted from the front wheel 117 by way of the wheel support member 4 acts on the lower arm 3, for example, the damper unit 5 moves vertically along the direction of its central line L6 so smoothly that the twisting of the connection portion of the upper end portion 53 of the damper unit 5 to the vehicle body (the attaching bracket 102b provided at the suspension tower 102, for example (see FIG. 2)) can be suppressed.

Further, the upper end portion 53 of the damper unit 5, that is, the vehicle-body-side connection portion of the dumper unit 5 to the suspension tower 102, is configured such that the characteristics of its resilient bush 53a thereof is made the best, without considering the twisting of the resilient bush 53a, and it is pivotally supported at the vehicle body via the bolt B3 (the axis L3) extending in the longitudinal direction (see FIGS. 1-3) similarly to the vehicle-body-side pivotal portions 21, 31 of the upper and lower arms 2, 3. Thereby, the twisting of the vehicle-body-side connection portion of the dumper unit 5 can be minimized.

Moreover, since all of the resilient bushes 25, 35, 53a, 54a of the front and rear vehicle-body-side pivotal portions 21f, 21r of the upper arm 2, the front and rear vehicle-body-side pivotal portions 31f, 31r of the lower arm 3, and the upper end portion 53 and the lower end portion 54 of the damper unit 5 are configured such that their axial lines L1, L2, L3, L4 extend in the longitudinal direction in the plan view, the support rigidity for the vehicle-width-direction load can be further increased and also the compliance for the vertical-direction load can be further increased by utilizing the well-known characteristics of the pivotal-type resilient bush which has the low elastic coefficient in the rotational direction (the vertical direction) and the high elastic coefficient in the direction perpendicular to the axis (the direction perpendicular to the longitudinal direction).

Meanwhile, since the upper arm 2 is supported at the front side frame 100 such that the axial lines L1 of the respective resilient bushes 25f, 25r of the front and rear vehicle-body-side pivotal portions 21f, 21r coaxially extends obliquely rearward and downward in the side view, the pitch center Pc of the front wheel 117 can be set properly by working together with the horizontal lower arm 3, thereby improving the anti-dive characteristics (see FIG. 2).

Thus, the front suspension device 1 of the present embodiment can improve the road-following property of the front wheel 117 and the vehicle handling stability (the controllability of the front wheel 117) by ensuring the anti-dive characteristics, making the upper and lower arms 2, 3, including the damper unit 5, move smoothly in the vertical direction so as not to cause the twisting of the resilient bushes 25, 35, 53a, 54a, and providing the vehicle-width-direction high support rigidity.

In the embodiment of the present invention, the upper and lower arms 2, 3 are respectively made of the A-shaped arm which has a symmetrical shape in the longitudinal direction (see FIGS. 5 and 6).

According to the present structure, a load balance between the front and rear resilient bushes 25, 35 for the load applied from the wheel 117 can be increased by the upper and lower arms 2, 3. Thereby, the twisting of the respective resilient bushes 25, 35, 53a, 54a provided at the vehicle-body-side pivotal portions of the upper and lower arms 2, 3 and the damper unit 5 can be further suppressed, so that changes of the kingpin angle or the caster angle can be further decreased, thereby improving the handling stability and making the wheel's vertical move more smooth.

In the embodiment of the present invention, the damper unit 5 comprises the shock absorber 51 and the coil spring 52 which is provided at the upper portion of the shock absorber 51 such that the coil spring 52 overlaps the front side frame 100 in the vertical direction, the upper arm 2 is provided to straddle the coil spring 52 longitudinally (see FIGS. 1, 2 and 5), and the front-side resilient bush 25f of the upper arm 2 and the front-side resilient bush 35f of the lower arm 3 or the rear-side resilient bush 25r of the upper arm 2 and the rear-side resilient bush 35r of the lower arm 3 substantially overlap each other in the plan view, respectively.

According to the present structure, since the front and rear respective resilient bushes 25, 35 of the upper arm 2 and the lower arm 3 substantially overlap each other in the plan view, respective longitudinal pitches of the resilient bushes 25f, 25r, 35f, 35r of the upper and lower arms 2, 3 can be arranged so as to be the same. Moreover, the front and rear respective resilient bushes 25, 35 of the upper and lower arms 2, 3 are configured to extend in the longitudinal direction coaxially (L1, L2).

Further, by configuring the upper arm 2 to straddle the coil spring 52 longitudinally and configuring the front and rear resilient bushes 25f, 25r of the upper arm 2 such that their longitudinal pitch is the same as that of the front and rear resilient bushes of the lower arm 3, the longitudinal pitch of the front and rear resilient bushes 25f, 25r of the upper arm 2 becomes greater than that of resilient bushes of the normal upper arm, so that the support rigidity of the king-pin angle or the caster angle can be increased properly regardless of setting of the hardness of the vehicle-body-side resilient bushes 25f, 25r.

Moreover, according to the above-described structure, by providing the coil spring 52 at the upper portion of the damper unit 5, that is, at the upper portion of the shock absorber 51 to overlap the front side frame 100 in the vertical direction, and providing the upper arm 2 to straddle the coil spring 52 longitudinally, the upper arm 2 is possibly located at a higher level than a level corresponding to the level of the coil spring 52, compared to the conventional device, so that a vertical pitch of the both arms can be sufficiently ensured. Thereby, the support rigidity of the king-pin angle or the caster angle can be increased properly regardless of setting of the hardness of the vehicle-body-side resilient bushes 25f, 25r as well.

Also, in the embodiment of the present invention, the damper unit 5 is connected to a portion of the lower arm 3 which is positioned in back of the knuckle-side pivotal portion 32 of the lower arm 3, and the central axis L6 of the damper unit 5 is positioned in front of the knuckle-side pivotal portion 22 of the upper arm 2 (see FIG. 2).

According to the above-described structure, by configuring the upper and lower arms 2, 3 such that the front and rear resilient bushes 25, 35 substantially overlap each other in the plan view, the layout of the upper and lower arms 2, 3 and the damper unit 5 can be more properly compact, setting the caster angle at an appropriate angle.

In correspondence of the present invention to the above-described embodiment, the front suspension structure of the present invention corresponds to the front suspension device 1, 1A of the above-described embodiments. Likewise, the front and rear vehicle-body-side pivotal portions correspond to the vehicle-body-side pivotal portions 21, 31, and the knuckle member corresponds to the wheel support member 4. However, the present invention should not be limited to the above-described embodiments.

For example, the front suspension structure of the present invention is not limited to the one comprising the A-shaped lower arm 3 like the above-descried embodiments, and the front suspension structure comprising the L-shaped lower arm 3A as shown in FIG. 8 can be applied. FIG. 8 is an explanatory diagram of the front suspension device 1A of another embodiment, which schematically shows, omitting the wheel support member 4. While the front suspension device 1A of the other embodiment will be described, the same structures as the above-described embodiments will be denoted by the same reference characters except particular description, specific explanations of which are omitted. Reference character 116 in FIG. 8 denotes a dash panel.

The front suspension device 1A of the other embodiment which comprises the L-shaped lower arm 3A is configured, similarly to the above-described embodiments, such that the axial lines L2 of the front and rear resilient bushes 35Af, 35Ar coaxially extend in the longitudinal direction, the lower end portion 54 of the shock absorber 51 is connected to the lower arm 3A such that the damper unit 5 is positioned perpendicularly to the axial line L2 of the lower arm 3A in the side view, and the upper end portion 53 of the shock absorber 51 is pivotally supported at the suspension tower 102 via the bolt B3 which forms the rotational axis L3 extending in the longitudinal direction.

In the abode-described structure, similarly to the above-described embodiments, the damper unit 5 is located so perpendicularly to the horizontal lower arm 3 that the load transmitted from the front wheel 117 can be received straightly by the damper unit 5 via the lower arm 3A, and also the respective twisting of the front and rear vehicle-body-side pivotal portions 21f, 21r, 31Af, 31Ar of the upper and lower arms 2, 3 and all of the resilient bushes 25f, 25r, 35Af, 35Ar, 53a, 54a of the upper and lower end portions 53, 54 of the damper unit 5 can be minimized.

What is claimed is:
1. A double-wishbone type front suspension structure of an automotive vehicle, comprising:
an upper arm pivotally supported at a vehicle-body side via front-and-rear pivotal portions thereof;
a lower arm pivotally supported at the vehicle-body side via front-and-rear pivotal portions thereof; and a damper unit provided between a vehicle body and the lower arm, wherein resilient bushes are provided at the respective front-and-rear pivotal portions of said upper arm and said lower arm, respective axial lines of said resilient bushes of the front-and-rear pivotal portions of the lower arm are provided to coaxially extend in a longitudinal direction and horizontally, a knuckle-side pivotal portion of the upper arm, via which a knuckle member is pivotally supported at the upper arm, is provided in back of a knuckle-side pivotal portion of the lower arm, via which the knuckle member is pivotally supported at the lower arm, the upper arm is supported at a front side frame such that respective axial lines of said resilient bushes of the front-and-rear pivotal portions of the upper arm coaxially extend in the longitudinal direction, in parallel to said respective axial lines of the resilient bushes of the front-and-rear pivotal portions of the lower arm in a plan view, and extends obliquely rearward and downward in a side view, and a lower end portion of said damper unit is connected to the lower arm such that the damper unit is positioned perpendicularly to the axial lines of the resilient bushes of the front-and-rear pivotal portions of the lower arm and an upper end portion of said damper unit is pivotally supported at the vehicle body via a resilient bush, a rotational axis of which extends in the longitudinal direction in parallel to the axial lines of the resilient bushes of the front-and-rear pivotal portions of the lower arm, said upper and lower arms are respectively made of an A-shaped arm which has a roughly symmetrical shape in the longitudinal direction, said damper unit comprises a shock absorber and a coil spring which is provided at an upper portion of the shock absorber such that the coil spring overlaps said front side frame in a vertical direction, said upper arm is provided to straddle said coil spring longitudinally, and said respective resilient bushes provided at the front-and-rear pivotal portions of the upper arm and the lower arm substantially overlap each other in the plan view, and said damper unit is connected to a portion of said lower arm which is positioned in back of said knuckle-side pivotal portion of the lower arm, and a central axis of the damper unit is positioned in front of said knuckle-side pivotal portion of the upper arm.

2. A double-wishbone type front suspension structure of an automotive vehicle, comprising:

an upper arm pivotally supported at a vehicle-body side via front-and-rear pivotal portions thereof;

a lower arm pivotally supported at the vehicle-body side via front-and-rear pivotal portions thereof; and a damper unit provided between a vehicle body and the lower arm, wherein resilient bushes are provided at the respective front-and-rear pivotal portions of said upper arm and said lower arm, respective axial lines of said resilient bushes of the front-and-rear pivotal portions of the lower arm are provided to coaxially extend in a longitudinal direction, a knuckle-side pivotal portion of the upper arm, via which a knuckle member is pivotally supported at the upper arm, is provided in back of a knuckle-side pivotal portion of the lower arm, via which the knuckle member is pivotally supported at the lower arm, the upper arm is supported at a front side frame such that respective axial lines of said resilient bushes of the front-and-rear pivotal portions of the upper arm coaxially extend in the longitudinal direction, in parallel to said respective axial lines of the resilient bushes of the front-and-rear pivotal portions of the lower arm in a plan view, and extends obliquely rearward and downward in a side view, and a lower end portion of said damper unit is connected to the lower arm such that the damper unit is positioned perpendicularly to the axial lines of the resilient bushes of the front-and-rear pivotal portions of the lower arm and an upper end portion of said damper unit is pivotally supported at the vehicle body via a rotational axis which extends in the longitudinal direction in parallel to the axial lines of the resilient bushes of the front-and-rear pivotal portions of the lower arm, and said damper unit comprises a shock absorber and a coil spring which is provided at an upper portion of the shock absorber such that the coil spring overlaps said front side frame in a vertical direction, said upper arm is provided to straddle said coil spring longitudinally, and said respective resilient bushes provided at the front-and-rear pivotal portions of the upper arm and the lower arm substantially overlap each other in the plan view.

3. A double-wishbone type front suspension structure of an automotive vehicle, comprising:

an upper arm pivotally supported at a vehicle-body side via front-and-rear pivotal portions thereof;

a lower arm pivotally supported at the vehicle-body side via front-and-rear pivotal portions thereof; and a damper unit provided between a vehicle body and the lower arm, wherein resilient bushes are provided at the respective front-and-rear pivotal portions of said upper arm and said lower arm, respective axial lines of said resilient bushes of the front-and-rear pivotal portions of the lower arm are provided to coaxially extend in a longitudinal direction, a knuckle-side pivotal portion of the upper arm, via which a knuckle member is pivotally supported at the upper arm, is provided in back of a knuckle-side pivotal portion of the lower arm, via which the knuckle member is pivotally supported at the lower arm, the upper arm is supported at a front side frame such that respective axial lines of said resilient bushes of the front-and-rear pivotal portions of the upper arm coaxially extend in the longitudinal direction, in parallel to said respective axial lines of the resilient bushes of the front-and-rear pivotal portions of the lower arm in a plan view, and extends obliquely rearward and downward in a side view, and a lower end portion of said damper unit is connected to the lower arm such that the damper unit is positioned perpendicularly to the axial lines of the resilient bushes of the front-and-rear pivotal portions of the lower arm and an upper end portion of said damper unit is pivotally supported at the vehicle body via a rotational axis which extends in the longitudinal direction in parallel to the axial lines of the resilient bushes of the front-and-rear pivotal portions of the lower arm, and said damper unit is connected to a portion of said lower arm which is positioned in back of said knuckle-side pivotal portion of the lower arm, and a central axis of the damper unit is positioned in front of said knuckle-side pivotal portion of the upper arm.

* * * * *